UNITED STATES PATENT OFFICE.

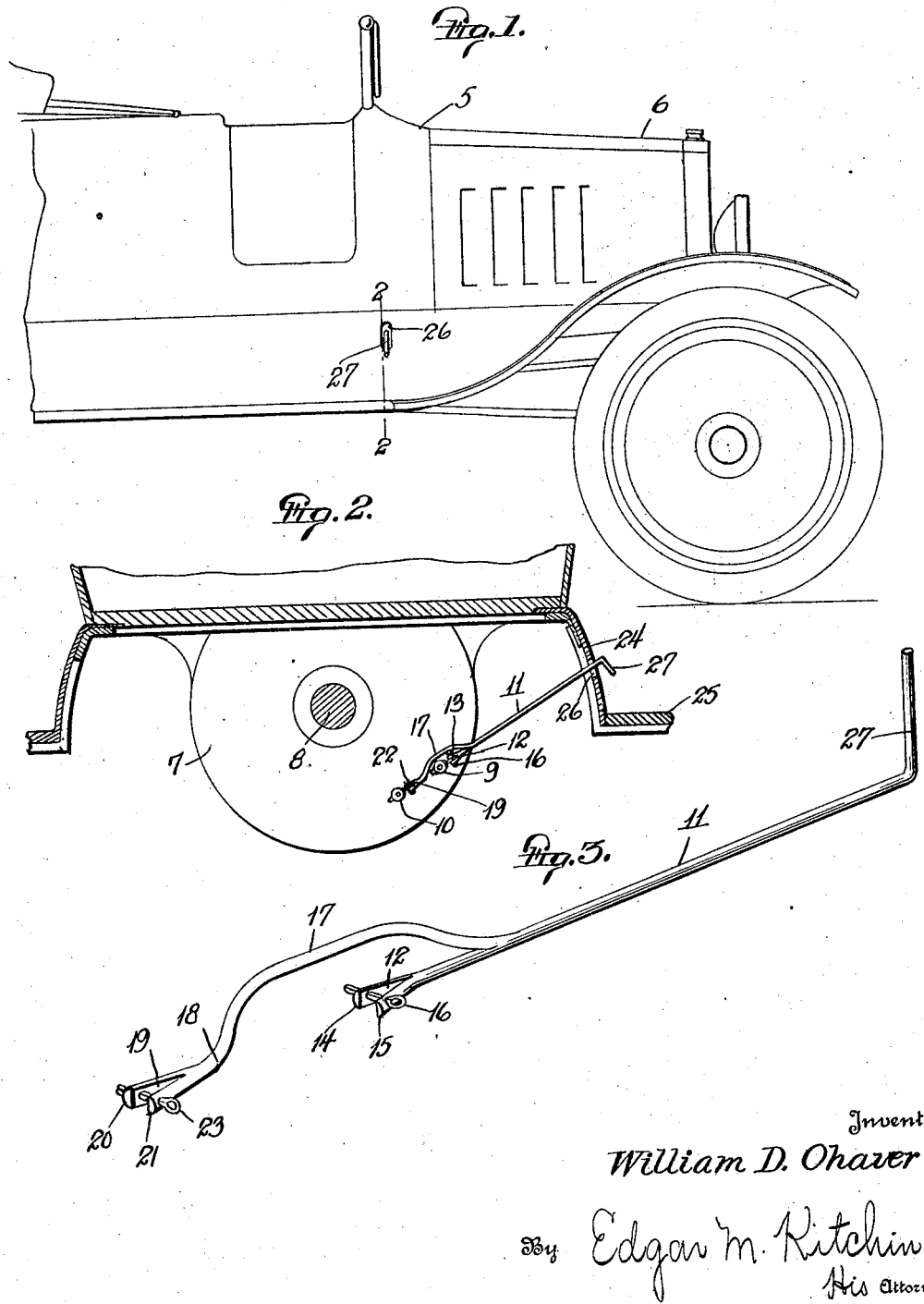

WILLIAM D. OHAVER, OF JUDSON, INDIANA, ASSIGNOR TO MONTGOMERY MFG. COMPANY, OF WAVELAND, INDIANA, A CORPORATION OF INDIANA.

HANDLE FOR OPERATING OIL-LEVEL PETCOCKS.

1,388,150.   Specification of Letters Patent.   Patented Aug. 16, 1921.

Application filed January 24, 1920. Serial No. 353,765.

*To all whom it may concern:*

Be it known that I, WILLIAM D. OHAVER, a citizen of the United States, residing at Judson, in the county of Parke and State of Indiana, have invented certain new and useful Improvements in Handles for Operating Oil-Level Petcocks; and I do hereby declare the following to be a full, clear, and exact description of the invention, such as will enable others skilled in the art to which it appertains to make and use the same.

The present invention relates to improvements in handles for operating oil level pet cocks, and has for an object to provide an improved handle whereby pet cocks on the crank cases of automobiles, which are arranged at different levels to show the height of the oil in the crank case, may be simultaneously operated from a convenient point.

At the present time, it is necessary in ascertaining the height of the oil level in the crank case to reach beneath the vehicle and separately turn each pet cock, which is a source of much annoyance and inconvenience to drivers of motor cars.

Especially is this annoyance and inconvenience found to exist in connection with such automobiles as have these pet cocks located on the rear wall of the crank case almost directly beneath the center of the vehicle, so that they require inspection from beneath the running board and may be reached only at the risk of soiling the clothing from grease and the dirt accumulated on the under side of the running board.

Another object of the present invention is to provide for the simultaneous operation of pet cocks so that the oil level may be more quickly ascertained than is done by opening the pet cocks singly.

A further object of the present invention resides in providing a device for the simultaneous operation of oil level pet cocks which will be of an exceedingly simple and cheap construction and well adapted for use, while inconspicuous, and yet always in a convenient position for quick operation.

With these and further objects in view, as will in part hereinafter become apparent and in part be stated, the invention comprises certain novel constructions, combinations and arrangements of parts as subsequently specified and claimed.

In the accompanying drawing,—

Figure 1 is a fragmentary, side elevation of a well known type of automobile shown as equipped with a device embodying the present invention.

Fig. 2 is a cross sectional view taken on the line 2—2 of Fig. 1, and looking toward the front of the vehicle.

Fig. 3 is a perspective view of the improved pet cock operator detached and seen on an enlarged scale.

Referring more particularly to the drawing, wherein only a single embodiment of the invention is illustrated, 5 designates generally a well known type of automobile having a hood 6 beneath which is located the motor or engine (not shown) and 7 represents the crank case of such motor, which, according to the usual practice, is supplied with a quantity of oil. The crank shaft of the engine appears at 8 in Fig. 2, the cranks of which (also not shown) dip down into the oil supply contained in the crank case 7 and receive lubrication, which they also splash upon other moving parts.

In accordance with the usual construction, one or more pet cocks are secured, generally, to the rear wall of the crank case 7 as shown in Fig. 2 for the purpose of allowing oil to drip therefrom, when opened, and in this way the driver of the car may be informed as to the height of the oil level within the crank case 7. When acquainted with the fact that the oil level has receded, the driver of the machine may thus attend to the refilling of the crank case.

The present embodiment of the invention is shown in connection with an automobile which employs two pet cocks 9 and 10, respectively, situated at different levels. In accordance with the practice now generally prevailing among owners of such automobiles, the upper pet cock 9 is from time to time opened and if oil issues therefrom the owner knows that the crank case 7 is supplied with the necessary quantity of lubricant. On the other hand, should no oil be discharged from the pet cock 9, then the operator must have recourse to the second or lower pet cock 10. If upon opening this lower pet cock oil issues therefrom, the operator knows that the oil level in the crank case has not receded below a dangerous level, and he, therefore, does not hesitate to drive his car on the remaining oil to a garage or filling station, where the crank case is replenished. However, in case no oil drips from the lower pet cock 10, then the operator is thereby informed that the oil has receded to a very low point in the crank case 7, and, if prudent, he will drive his car no farther until a fresh supply of oil has been put into the crank case.

These two operations involve delay and inconvenience which the present invention obviates.

The invention, in its present form, consists of a rod 11 of rigid metal or some other appropriate material having one end split, as indicated at 12, and spread apart in order to receive therebetween the finger piece or handle 13 of the upper pet cock 9. The split fork 14, 15, is also provided with alining perforations through which may be passed a cotter pin 16 or other suitable device, which also passes through the thumb piece or handle 13 of the pet cock in order to securely hold the operating bar 11 thereto.

Merging from the operating bar 11 in the rear of the fork 14, 15, is a bow-shaped rod or extension 17, bent in such wise as to escape coming into engagement with any parts of the upper pet cock 9 while allowing the bar 11 and rod 15 to be rotated through approximately a half turn. The outer free end of the rod 17 is bent down in order to extend in substantially the same plane with the rod 11, as indicated at 18, and the same is split at 19, providing forks 20 and 21 which are spread apart to receive the thumb piece or handle 22 on the lower pet cock 10. In a similar manner, a cotter pin or other suitable fastening 23 may pass through the forks 20 and 21 and through the thumb piece or handle 22.

The operating bar 11 is of a suitable length to pass through the mud guards or aprons 24, which extend between the car body and the running board 25. A small aperture 26 is made in the apron 24 to receive the upper end of the operating bar 11, the extremity of which is preferably turned at right angles to the body of the bar, as shown at 27, to facilitate grasping and rotation thereof. The opening 26 may be elongated, as shown in Figs. 1 and 2, in order to also permit the operator to look through the same and observe the dripping of oil from the pet cocks 9 and 10.

In use, the only alteration required to mount the invention in connection with standard parts of many of the present types of automobiles is to cut the opening 26 in the apron 24 and to perforate the thumb pieces or handles 13 and 22 of the pet cocks. The device is then readily applied by engaging such thumb pieces or handles between the respective forks carried by the operating bar 11, after which the cotter pins 16 and 23 are put in place.

By turning the handle 27, the bar 11 may be rotated to cause the pet cocks 9 and 10 to be simultaneously opened, and in case oil drips from both pet cocks the operator is quickly and accurately informed that a sufficient quantity of lubrication is present in the crank case 7. However, should oil drip only from the pet cock 10, and not from the upper pet cock 9, then the operator is warned that the oil supply is getting low, and should oil not drip from either pet cock, a dangerous low level has been reached and it is not advisable to drive the car farther before replenishing the oil supply.

It will be appreciated that the present improved device is capable of installation without material alteration of the automobile to which it is applied, and may be manufactured at small expense, and when applied forms a convenient and durable device for the purposes above fully stated. Obviously, other means of engagement with the pet cocks than the bifurcations and cotter pins may be provided without departing from the invention.

What is claimed is:—

1. A device for operating oil level pet cocks including a rotatable operating bar, and means carried by said bar for engaging with a plurality of pet cocks, whereby to simultaneously operate the same when the bar is turned.

2. An improved operator for oil level pet cocks including an elongated bar having one end portion thereof split and the divided ends spread apart providing a pair of forks, and a rod merging with the bar and bowed centrally to admit of rotation of the rod, said rod also having a split free end portion with the parts at opposite sides of the split bent apart to provide a second fork, said forks being adapted to be engaged with the handles or thumb pieces of a plurality of pet cocks.

3. An improved operator for oil level pet cocks including an elongated bar having one end portion split and spread apart to provide a fork, the fork having perforations therein, a rod merged with the bar inwardly of the fork and being bowed to rotate about a pet cock, the free end portion of said bowed rod extending in alinement with said operating bar and being split and spread apart to provide a second fork also having perforations therein, said forks being adapted to be received over the thumb pieces or handles of a plurality of pet cocks, and fastening means passing through the perforated forks and adapted to extend through such handles or thumb pieces.

4. A device for operating oil level pet cocks comprising a bar having pet-cock engaging means at one portion, and a second bar rigidly connected to and extending from the first bar past the pet-cock engaging means thereof and having pet-cock engaging means spaced from the first-mentioned pet-cock engaging means, the second-mentioned bar being offset away from the first-mentioned pet-cock engaging means.

In testimony whereof I affix my signature in presence of two witnesses.

WILLIAM D. OHAVER.

Witnesses:
  QUINCY A. MYERS,
  HARDY W. ROBBINS.